(12) United States Patent
Gawor et al.

(10) Patent No.: US 8,140,628 B2
(45) Date of Patent: Mar. 20, 2012

(54) ENFORCING CONFORMANCE IN EMAIL CONTENT

(75) Inventors: Jaroslaw Gawor, Apex, NC (US); Richard K. McGuire, Sandy Hook, MA (US); Paul F. McMahan, Apex, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 12/176,877

(22) Filed: Jul. 21, 2008

(65) Prior Publication Data
US 2010/0017485 A1 Jan. 21, 2010

(51) Int. Cl.
*G06F 15/16* (2006.01)
(52) U.S. Cl. ....................................................... 709/206
(58) Field of Classification Search .................... 709/206
See application file for complete search history.

(56) References Cited

U.S. PATENT DOCUMENTS

| | | | | |
|---|---|---|---|---|
| 5,923,848 A * | 7/1999 | Goodhand et al. | ............ | 709/219 |
| 7,856,476 B2 * | 12/2010 | Halahmi et al. | ............... | 709/206 |
| 2002/0042815 A1 * | 4/2002 | Salzfass et al. | ................ | 709/206 |
| 2003/0069975 A1 * | 4/2003 | Abjanic et al. | ................. | 709/227 |
| 2003/0135567 A1 * | 7/2003 | Reilly | ............................ | 709/206 |
| 2004/0006598 A1 * | 1/2004 | Damm et al. | .................. | 709/206 |
| 2005/0188026 A1 * | 8/2005 | Hilbert et al. | ................. | 709/206 |
| 2006/0015755 A1 * | 1/2006 | Jaffe | ............................. | 713/193 |

* cited by examiner

*Primary Examiner* — Wing Chan
*Assistant Examiner* — David X Yi
(74) *Attorney, Agent, or Firm* — Jeffrey T. Holman

(57) ABSTRACT

In an email message method and system, an email server receives at least one user-defined constraint for a first email message, where the user-defined constraint comprises at least one of an expected format and expected content of a reply email message. The email server associates the at least one user-defined constraint with the first email message and sends the first email message to a recipient. In response to receiving the reply email message, the email server validates the reply email message against the at least one user-defined constraint.

24 Claims, 5 Drawing Sheets

Enable the sender to create an email message, define constraints for the email message, and send the email message with the constraints
300

Process the email message and constraints from the sender
302

Send the email message and the constraints to the email server
304

FIG. 3

ENFORCING CONFORMANCE IN EMAIL CONTENT

BACKGROUND OF THE INVENTION

Email has become a dominant means of communication over the years. Email has been increasingly pervasive, and is commonly used among users within business. In some cases, the sender of an email message expects reply email messages to be in a certain format or to follow some specific syntax. For example, in an email exchange involving a voting process, the reply email messages may be required to contain numbers between −1 and +1 (where −1 indicates "no," and +1 indicates "yes"). Otherwise, the reply would be less useful, or not useful.

There are existing solutions that address this type of problem. For example, one solution enables the sender to send a form via an email. A recipient can then fill out the form using their email client and send the form back to the sender. The reply email message can be sent as XML and validated using an XML schema. However, the main drawback of this solution is that it requires a fat (and/or proprietary) email client that is configured to understand the form and to render the form properly. A fat email client is an email client that requires software other than the browser that is installed on a given computer. Once configured, the fat email client generates the form using predefined constraints and processes the form. The user cannot change the form or specify the constraints.

BRIEF SUMMARY OF THE INVENTION

In an email message method and system, an email server receives at least one user-defined constraint for a first email message, where the user-defined constraint comprises at least one of an expected format and expected content of a reply email message. The email server associates the at least one user-defined constraint with the first email message and sends the first email message to a recipient. In response to receiving the reply email message, the email server validates the reply email message against the at least one user-defined constraint.

BRIEF DESCRIPTION OF THE DRAWINGS

FIG. 3 is a diagram illustrating a process for performed by an email client sending out an email message with constraints in accordance with an exemplary embodiment.

DETAILED DESCRIPTION OF THE INVENTION

The present invention relates to a method and system for enforcing conformance in email content. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The exemplary embodiment of the present invention provides a method and system for enforcing conformance in email content. The method and system enable a sender to define constraints for a given email message. A given constraint may include the expected format of a reply email message and expected content. The method also enables an email server to associate user-defined constraints with outgoing email messages and validate incoming reply email messages against the constraints.

Although the present invention disclosed herein is described in the context of email messages, the present invention may apply to other types of electronic messages, and still remain within the spirit and scope of the present invention.

Figure 1:
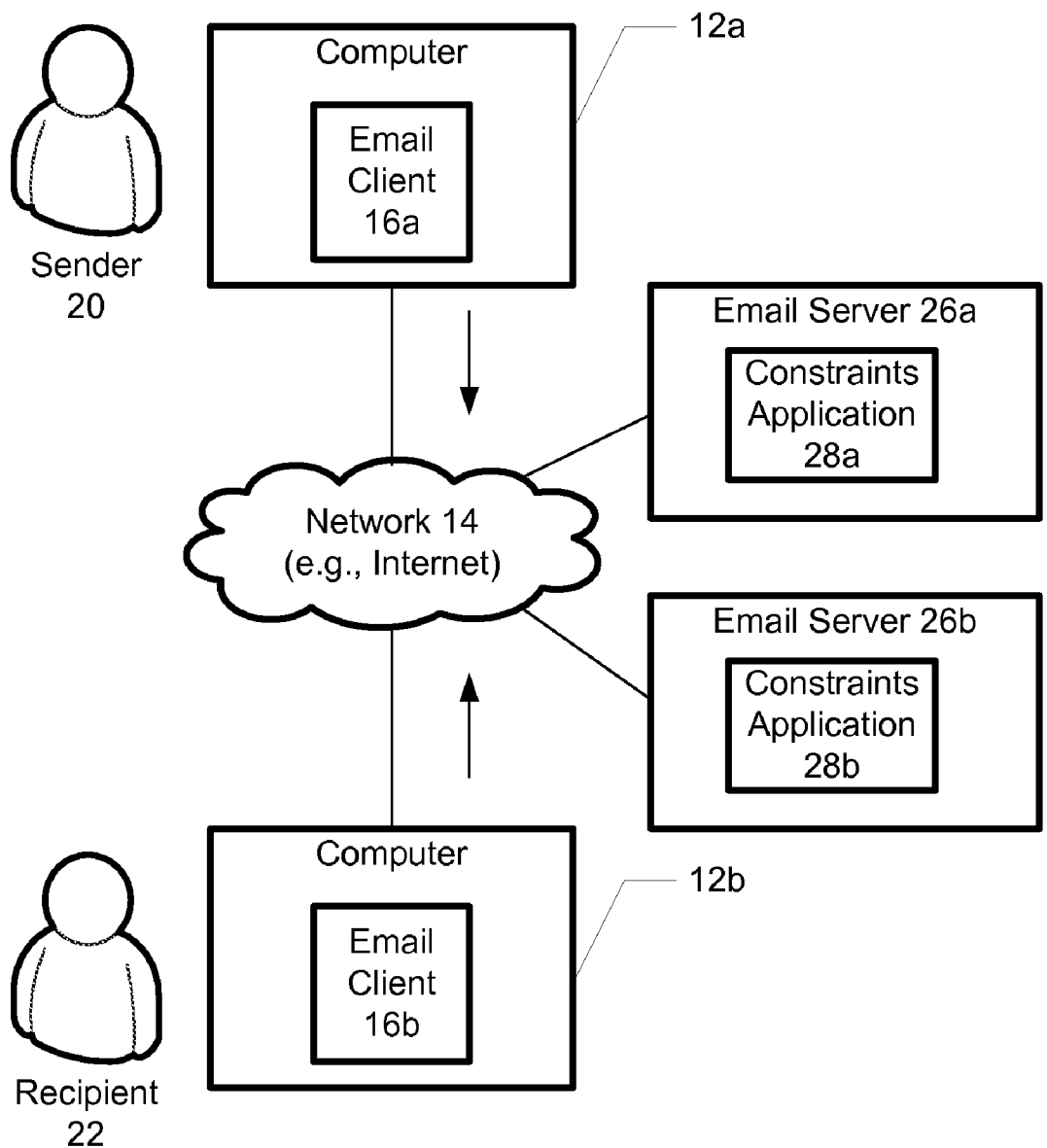
FIG. 1 is a logical block diagram illustrating an exemplary network system environment in which one embodiment of the present invention may be implemented for enforcing conformance in email content.

FIG. 1 is a logical block diagram illustrating an exemplary network system environment in which one embodiment of the present invention may be implemented for enforcing conformance in email content. A network system environment 10 is shown in which two or more computers 12a and 12b communicate over a network 14. The network 14 may be a public network, such as the Internet, or a private network, such as an intranet, LAN, or WLAN, or a combination of the above. At least a portion of the computers 12a and 12b may execute corresponding email messaging clients, such as email clients 16a and 16b. As is well-known, email clients 16a and 16b allow email communication between two or more users through the transmissions of email messages between the email clients 16a and 16b of networked computers 12a and 12b. As FIG. 1 shows, email client 16a enables a user 20 to send and receive email messages, and email client 16b enables a user 22 to send and receive email messages. For the purposes of illustration, user 20 is also referred to as sender 20, and user 22 is also referred to as recipient 22.

In one embodiment, email client 16a sends and receives email messages via an email server 26a, and email client 16b sends and receives email messages via an email server 26b. However, other configurations are possible. For example, in one embodiment, both email clients 16a and 16b may send and receive email messages via the same email server. This would be the case if, for example, both users 20 and 22 exchange email messages using the same email server of the same service provider.

In particular embodiments, each of the email servers 26a and 26b may be divided into subservers. For example, email server 26a may have a Simple Mail Transport Protocol (SMPT) outbound server for sending email messages and a Post Office Protocol (POP3) or Internet Message Access Protocol (IMAP) inbound server for receiving email messages. For ease of illustration, each of the email servers 26a and 26b are described as performing outbound and inbound functions. As described in more detail below in connection with FIGS. 2, 4, and 5, each of the email servers 26a and 26b also performs functions associated with constraint enforcement. In one embodiment, the email servers 26a and 26b may perform such functions using constraint applications 28a and 28b.

Figure 2:
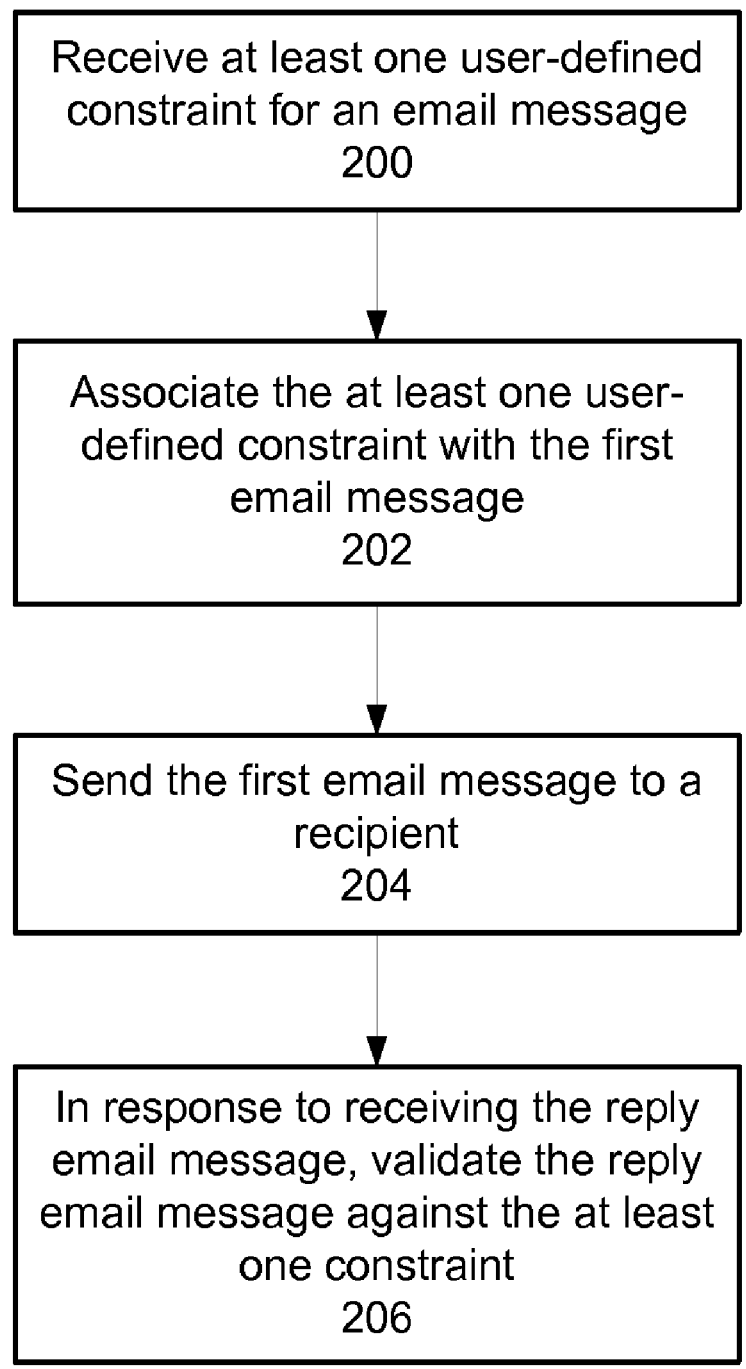
FIG. 2 is a diagram illustrating a process performed by an email server for enforcing compliance with email messages having constraints in accordance with an exemplary embodiment.

FIG. 2 is a diagram illustrating a process performed by an email server for enforcing compliance with email messages having constraints in accordance with an exemplary embodiment. Referring to both FIGS. 1 and 2, the process begins by the email server 26*a* receiving at least one user-defined constraint for an email message (block 200). As described in more detail below, a user-defined constraint may comprise an expected format and/or expected content of a reply email message. The email server 26*a* then associates the user-defined constraint(s) with the email message (block 202) and then sends the email message to a recipient 22 (block 204). In response to receiving the reply email message, the email server 26*a* validates the reply email message against the constraints (block 206). Exemplary embodiments of these blocks are described in more detail below in connection with FIGS. 3-5.

Figure 4:
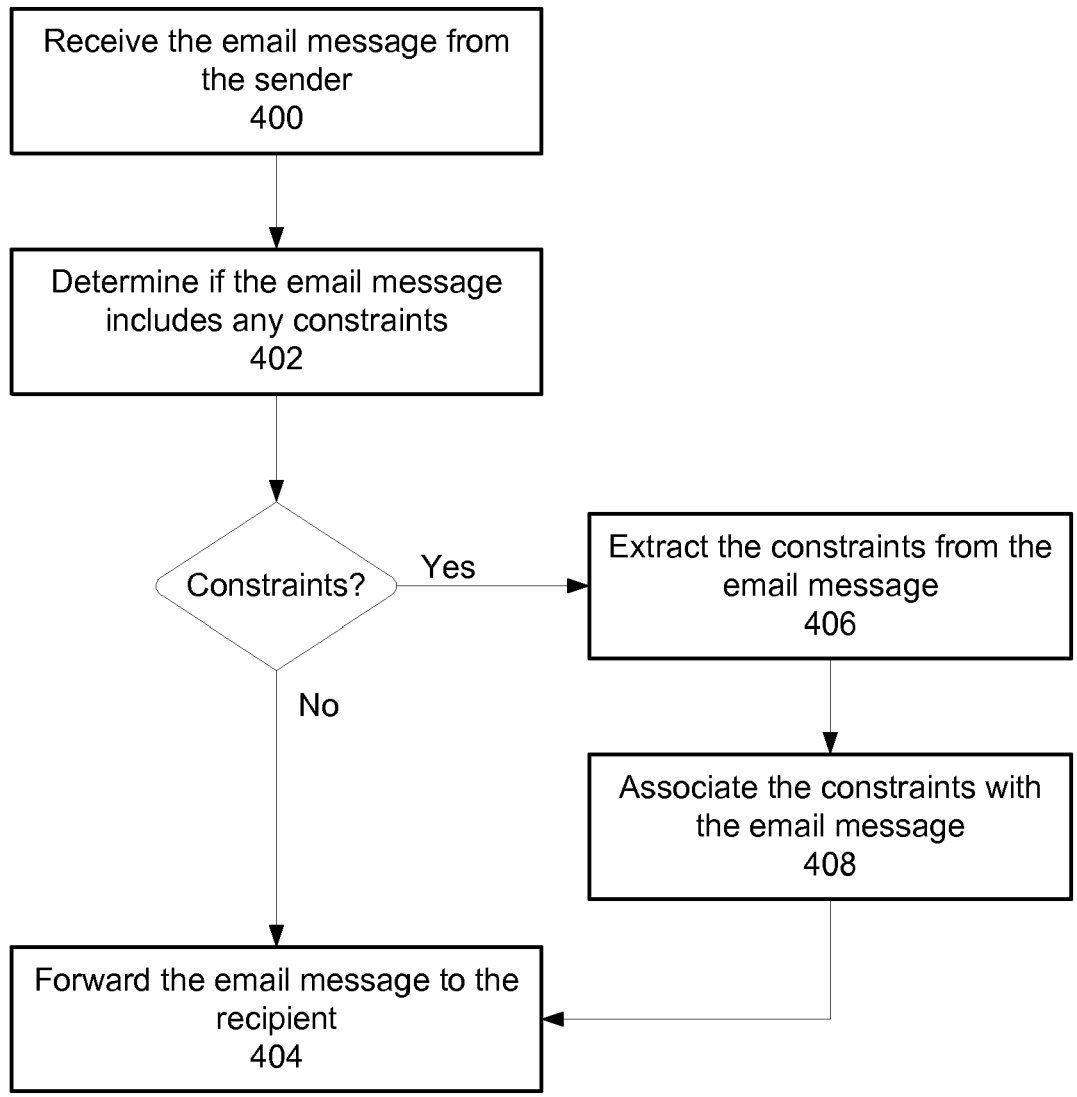
FIG. 4 is a diagram illustrating a process performed by an email server for sending out an email message with constraints in accordance with an exemplary embodiment.
Figure 5:
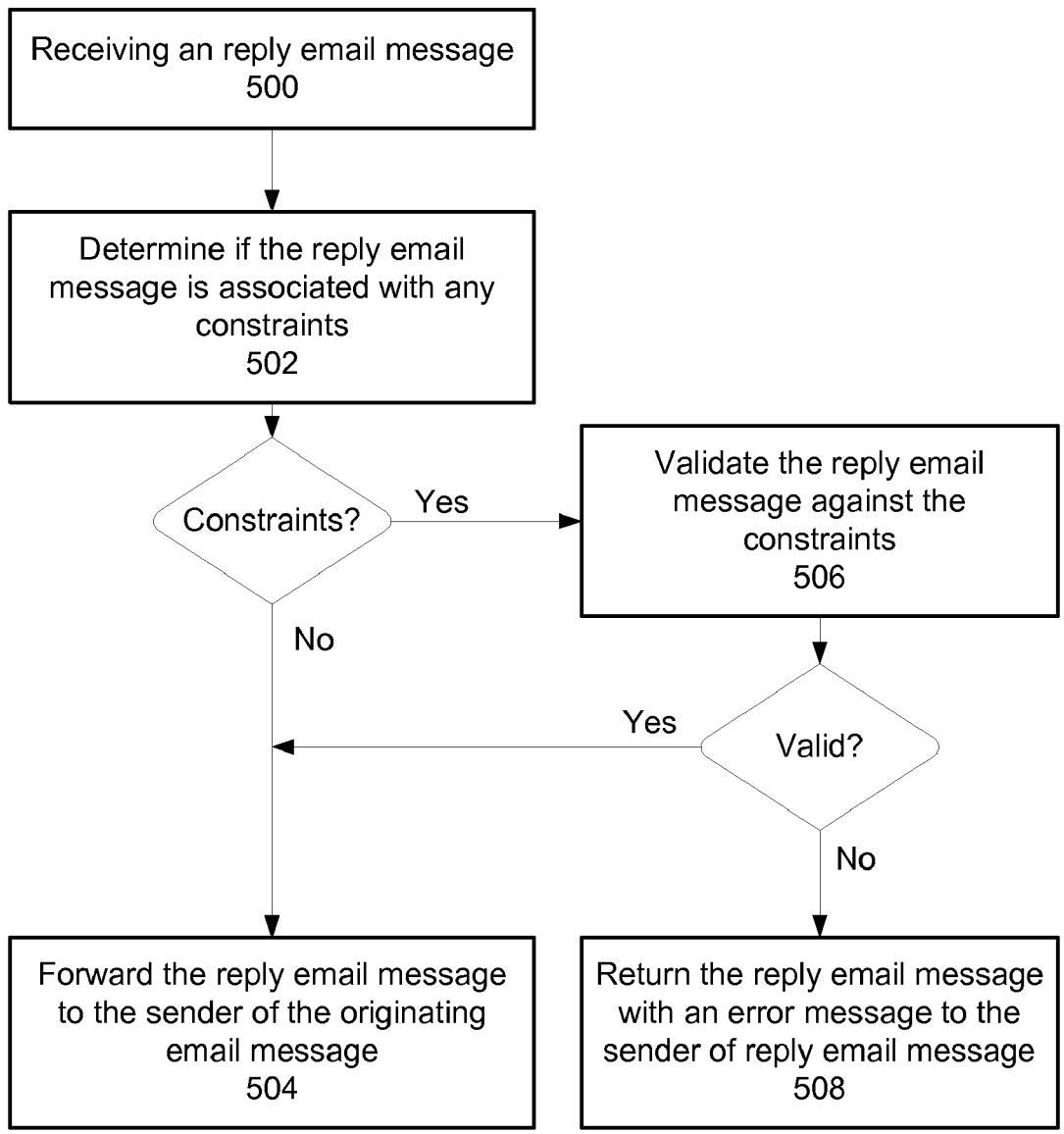
FIG. 5 is a diagram illustrating a process performed by an email server for receiving an email message with constraints in accordance with an exemplary embodiment.

Although embodiments of the present invention disclosed herein are described in the context of the email server performing the functions described in FIGS. 4 and 5 such as the association and validation aspects, embodiments of the present invention may apply to other network nodes, and still remain within the spirit and scope of the present invention. For example, in one embodiment, an email client may perform the functions described in FIGS. 4 and 5.

FIG. 3 is a diagram illustrating a process performed by an email client for sending out an email message with constraints in accordance with an exemplary embodiment. The process begins by the email client 16*a* enabling the sender 20 to create an email message, specify one or more constraints for the email message, and send the email message with the constraints (block 300).

In one embodiment, the email client 16*a* provides a user interface (UI) to enable or facilitate the user (e.g., sender 20) to define one or more constraints, where the UI also enables the user to specify as a part of the one or more constraints an expected format and expected content for reply email messages. Example constraints are described in more detail below. In one embodiment, the UI may be provided by existing functionalities of the email client 16*a* or may be provided by a plug-in or extension to the email client 16*a* or by a separate software application. In one embodiment, the UI may be a window with a field in which the sender 20 may enter a format. In one embodiment, the UI may be a window with a pull-down menu which the user may use to select a format. A constraint maybe expressed in many different formats. For example, a given constraint may specify the expected format of an email reply (e.g., an XML schema, Regular Expression, or some other proprietary format).

In one embodiment, the window may provide a field in which the sender 20 may enter a constraint expression to specify expected content in a reply email message. For example, a Regular Expression such as ".*(\+1|-1).*" may be provided for a vote email (e.g., a vote email eliciting votes for a release candidate for a software product) to check if the reply messages contain "+1" or "-1" text string to indicate "yes" or "no" vote. In one embodiment, a constraint expression may require a text string (e.g., an explanation for a particular vote). In one embodiment, a constraint expression may include fields for entering expected recipients of the email, an expected size of the message (e.g., no more than 50 characters), a date by which replies must be sent in (e.g., replies after 5 days are rejected), etc.

The email client 16*a* then processes the email message and constraints from the sender 20 (block 302) and then sends the email message and the constraints to the email server 26*a* (block 304). In one embodiment, the email client 16*a* may export the constraints as a file and attach the file to the email message. Alternatively, in one embodiment, the email client 16*a* may embed the constraints in the email message.

FIG. 4 is a diagram illustrating a process performed by an email server for sending out an email message with constraints in accordance with an exemplary embodiment. The process begins by the email server 26*a* receiving the email message from the sender 20 via email client 16*a* (block 400). The email server 26*a* then determines if the email message includes any constraints (block 402). If the email server 26*a* determines that there are no constraints in the email message, the email server 26*a* forwards the email message to the recipient 22 (block 404). Otherwise, if there are constraints, the email server 26*a* extracts the constraints from the email message (block 406) and then associates the constraints with the email message (block 408). In one embodiment, the email server 26*a* associates the constraints with the message subject or message ID of the email message, and stores the associated constraints. The email server 26*a* then forwards the email message to the recipient 22 via email client 16*b* (block 404).

As described above, the sender 20 and recipient 22 may use different email servers. In one embodiment, if the sender 20 and recipient 22 use different email servers, the email client 16*a* of the sender 20 may be configured to use the same server for outgoing and incoming email messages. In one embodiment, if two different servers are used for outgoing and incoming email messages, a proxy server may be used to bridge communication between the two servers. In another embodiment, the associations may be stored in a memory location that is accessible to both servers.

FIG. 5 is a diagram illustrating a process performed by an email server for receiving an email message with constraints in accordance with an exemplary embodiment. The process begins by the email server 26*a* receiving a reply email message (block 500). The reply email message is the email message that the recipient 22 has sent in response to the email message sent by the sender 20. For clarification, the email message sent by the sender 20 is also referred to as the originating email message. The email server 26*a* then determines if the reply email message is associated with any constraints (block 502). More specifically, in one embodiment, the email server 26*a* determines if there are any constraints associated with the message subject or message ID of the reply email message. For example, in one embodiment, the email server 26*a* may store the association in a memory or some database, etc. The email server 26*a* can later compare message subjects or message IDs of reply email messages to those in the memory. In one embodiment, each email message has its own unique message ID stored as a message header, and replies to other messages have another header (e.g. In-Reply-To header) to indicate that they are replies to another message using the unique ID of the original message. In another embodiment, the association may be attached to the originating email. As such, the email client of the recipient could also perform a validation before the email message is sent. If there are no constraints, the email server 26*a* forwards or sends the reply email message to the sender 20 of the originating email message (block 504).

If there are constraints, the email server 26*a* validates the reply email message against the constraints (block 506). In one embodiment, the email server 26*a* determines the format of the contents of the reply email message and then determines if the format matches the expected format that is specified in the constraint. For example, the email server 26*a* may look for a particular format (e.g., XML). In one embodiment, for a successful validation, the content of the reply email message must be in the specified format. In one embodiment, the email server 26*a* also searches the contents of the reply email message for particular content, which may include one or more keywords or text specified by the constraints, and then determines if the content matches the expected content that is specified in the constraint. For example, in one embodiment, the email server 26a may look for particular content such as text (e.g., a "+1" or a "−1" to indicate a yes or no vote, respectively). If the email server 26a detects particular text (e.g., "−1"), the email server 26a may look for other content such as keywords (e.g., an explanation for the particular vote). Other keywords may also include other information such as the sender, the date, the receiver, or other information in the header. In one embodiment, for a successful validation, the content of the reply email message must conform with the expected content. In one embodiment, the validation process may set headers in the email message to indicate the validation status so that email client filters can process the results. If the constraints are valid, the email server 26a forwards the reply email message to the sender 20 of the originating email message (block 504). If the constraints are not valid, the email server 26a returns the reply email message along with an error message indicating a validation error to the sender 22 of the reply email message (block 508). The sender 20 can then correct the reply email message and resend it (and the same validation process will start again).

Embodiments of the present invention may provide numerous benefits. For example, embodiments of the present invention enable a sender of an email message to define constraints for the email message, including specifying an expected format and expected content for reply email messages. And because enforcement of conformance of the user-defined constraints in reply email messages is performed by the email server, embodiments of the present invention may function with different types of email clients.

A method and system of enforcing conformance in email content has been disclosed. The invention can take the form of an entirely hardware embodiment, an entirely software embodiment or an embodiment containing both hardware and software elements. For example, the email servers 26a may be implemented with hardware, software, or combination thereof. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for processing email messages, the method comprising:
    receiving at least one user-defined constraint for a first email message, wherein the user-defined constraint comprises an expected format of a reply email message to the first email message and expected content of the reply email message;
    associating the at least one user-defined constraint with the first email message;
    sending the first email message to a recipient;
    in response to receiving the reply email message, validating the reply email message against the at least one user-defined constraint; and
    storing the association of the at least one user-defined constraint with the first email message in a memory location that is accessible to two email servers in communication with an email client of a sender of the first email message,
    wherein a first one of the email servers processes outgoing mail from the email client of the sender, including storing the association of the at least one user-defined constraint with the first email message in the memory location,
    wherein a second one of the email servers processes incoming mail to the email client of the sender, including validating the reply email message against the at least one user-defined constraint, wherein the validating comprises accessing the memory location to obtain the association of the at least one user-defined constraint with the first email message.

2. The method of claim 1 further comprising:
    determining if the first email message includes the at least one user-defined constraint; and
    performing the associating if the first email message includes the at least one user-defined constraint.

3. The method of claim 1 further comprising providing a user interface to facilitate a first user in defining the at least one user-defined constraint.

4. The method of claim 1 further comprising providing a user interface to facilitate a first user in defining the at least one user-defined constraint, wherein the user interface enables the first user to specify the expected format and the expected content.

5. The method of claim 1 further comprising:
    determining if the reply email message is associated with the at least one user-defined constraint; and validating the reply email message against the at least one user-defined constraint if the reply email message is associated with the at least one user-defined constraint.

6. The method of claim 5 wherein the validating comprises:
determining a format of the reply email message; and
determining if the format matches the expected format.

7. The method of claim 5 wherein the validating comprises:
determining a content of the reply email message; and
determining if the content matches the expected content.

8. The method of claim 5 further comprising returning to the recipient the reply email message with an error message indicating a validation error if the at least one user-defined constraint is not valid.

9. The method of claim 1 wherein an email server performs the associating.

10. A hardware implemented executable software product stored on a non-transitory computer-readable storage medium containing program instructions which, when executed by a processor within a computer, causes the computer to perform operations for processing email messages, the operations comprising:
receiving at least one user-defined constraint for a first email message, wherein the user-defined constraint comprises an expected format of a reply email message to the first email message and expected content of the reply email message;
associating the at least one user-defined constraint with the first email message;
sending the first email message to a recipient;
in response to receiving the reply email message, validating the reply email message against the at least one user-defined constraint; and
storing the association of the at least one user-defined constraint with the first email message in a memory location that is accessible to two email servers in communication with an email client of a sender of the first email message,
wherein a first one of the email servers processes outgoing mail from the email client of the sender, including storing the association of the at least one user-defined constraint with the first email message in the memory location,
wherein a second one of the email servers processes incoming mail to the email client of the sender, including validating the reply email message against the at least one user-defined constraint, wherein the validating comprises accessing the memory location to obtain the association of the at least one user-defined constraint with the first email message.

11. The executable software product of claim 10 wherein an email server associates the at least one user-defined constraint with the first email message.

12. The executable software product of claim 10 further comprising:
determining if the first email message includes the at least one user-defined constraint; and performing the associating if the first email message includes the at least one user-defined constraint.

13. The executable software product of claim 10 further comprising:
determining if the reply email message is associated with the at least one user-defined constraint; and
validating the reply email message against the at least one user-defined constraint if the reply email message is associated with the at least one user-defined constraint.

14. The executable software product of claim 13 wherein the validating comprises:
determining a format of the reply email message; and
determining if the format matches the expected format.

15. The executable software product of claim 13 further comprising returning to the recipient the reply email message with an error message indicating a validation error if the at least one user-defined constraint is not valid.

16. A hardware implemented email system comprising:
a server;
an application, the application which when executed by a processor within the server is operable to:
receive a first email message and a user-defined constraint for the first email message, wherein the user-defined constraint comprises at least one of an expected format of a reply email message to the first email message and expected content of the reply email message;
associate the at least one user-defined constraint with the first email message;
send the first email message to a recipient;
in response to receiving the reply email message, validate the reply email message against the at least one user-defined constraint; and
store the association of the at least one user-defined constraint with the first email message in a memory location that is accessible to two email servers in communication with an email client of a sender of the first email message,
wherein a first one of the email servers processes outgoing mail from the email client of the sender, including storing the association of the at least one user-defined constraint with the first email message in the memory location,
wherein a second one of the email servers processes incoming mail to the email client of the sender, including validating the reply email message against the at least one user-defined constraint, wherein the validating comprises accessing the memory location to obtain the association of the at least one user-defined constraint with the first email message.

17. The email system of claim 16 wherein the application is further operable to:
determine if the first email message includes the at least one user-defined constraint; and
perform the associating if the first email message includes the at least one user-defined constraint.

18. The email system of claim 16 wherein the application is further operable to provide a user interface to facilitate a first user in defining the at least one user-defined constraint.

19. The email system of claim 16 wherein the application is further operable to provide a user interface to facilitate a first user in defining the at least one user-defined constraint, wherein the user interface enables the first user to specify the expected format and the expected content.

20. The email system of claim 16 wherein the application is further operable to:
determine if the reply email message is associated with the at least one user-defined constraint; and
validate the reply email message against the at least one user-defined constraint if the reply email message is associated with the at least one user-defined constraint.

21. The email system of claim 20 wherein the validating comprises:
determining a format of the reply email message; and
determining if the format matches the expected format.

22. The email system of claim 20 wherein the application is further operable to return to the recipient the reply email message with an error message indicating a validation error if the at least one user-defined constraint is not valid.

23. The method of claim 1 further comprising configuring an email client of a sender of the first email message to use an email server for outgoing email messages and to use the same email server for incoming email messages.

24. The method of claim 1 further comprising:
   using a proxy server to bridge communication between two email servers;
   wherein a first one of the email servers processes outgoing mail from an email client of a sender of the first email message, including associating the at least one user-defined constraint with the first email message and sending the first email message to a recipient; and
   wherein a second one of the email servers processes incoming mail to the email client of the sender, including receiving the reply email message and validating the reply email message against the at least one user-defined constraint.

* * * * *